May 24, 1932.    J. A. WALLER    1,859,609
LIGHTING DEVICE FOR ORCHARD HEATERS
Filed July 28, 1930
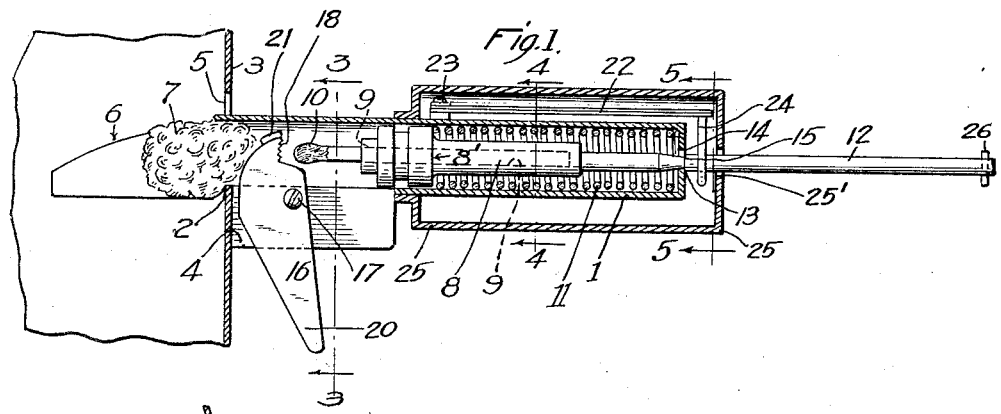
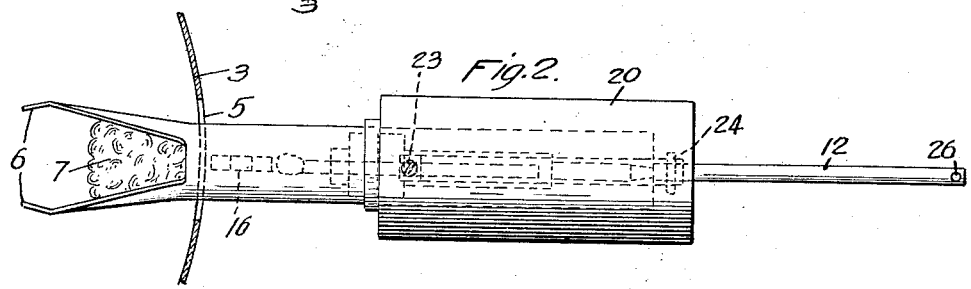
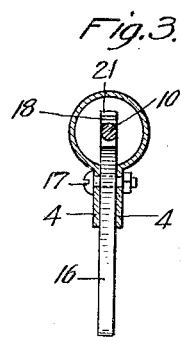 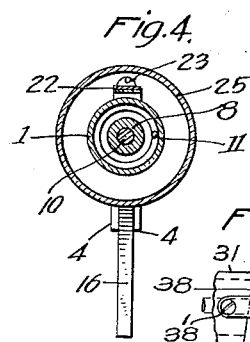 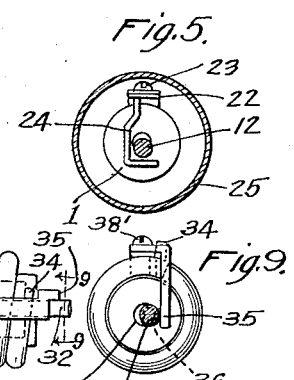
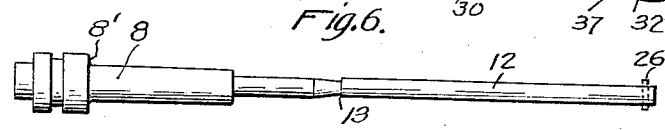
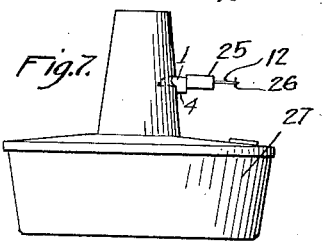
INVENTOR.
John A. Waller,
BY
ATTORNEYS.

Patented May 24, 1932

1,859,609

UNITED STATES PATENT OFFICE

JOHN A. WALLER, OF BEVERLY HILLS, CALIFORNIA, ASSIGNOR TO WALLER MANUFACTURING CORPORATION, LTD., OF LOS ANGELES, CALIFORNIA, A CORPORATION OF NEVADA

LIGHTING DEVICE FOR ORCHARD HEATERS

Application filed July 28, 1930. Serial No. 471,209.

This invention relates to means for automatically lighting orchard heaters, and the main object of the invention is to provide a device which will operate automatically to ignite the combustible contents of an orchard heater or similar device when the temperature reaches or approaches the danger point, requiring the operation of the heater.

A further object of the invention is to provide an orchard heater lighting device which can be attached to any orchard heater of usual or suitable type.

Another object of the invention is to provide an orchard heater lighting device which can be attached to an orchard heater and which will automatically detach itself therefrom after it has performed the igniting operation, so as to prevent the igniting device from being injured by the heat produced by the orchard heater.

Other objects of the invention will appear hereinafter.

The accompanying drawings illustrate embodiments of the invention and referring thereto:

Fig. 1 is a longitudinal section of the preferred form of the device in position on a portion of an orchard heater.

Fig. 2 is a plan view of the device shown in Fig. 1.

Fig. 3 is a section on line 3—3 in Fig. 1.

Fig. 4 is a section on line 4—4 in Fig. 1.

Fig. 5 is a section on line 5—5 in Fig. 1.

Fig. 6 is a side elevation of a movable member of the igniting means.

Fig. 7 is a side elevation of an orchard heater showing my improved lighting device in position thereon.

Fig. 8 is a side elevation of a modified form of thermostatic releasing means.

Fig. 9 is a section on line 9—9 in Fig. 8.

The device comprises a holder, or supporting means formed, for example, as a cylindrical casing 1, means on said supporting means for detachably mounting the device in position on an orchard heater, means on said supporting means for retaining a body of combustible material, means mounted on said supporting means for igniting said body of combustible material and for ejecting the ignited body of combustible material from the supporting means and thermostatically controlled means for automatically operating said igniting and ejecting means as hereinafter described.

In order to retain the holder or casing 1 on the orchard heater, said holder or casing may be provided at its lower portion with shoulders 2 adapted to engage inside of a wall portion 3 on the orchard heater and with lugs or shoulder members 4 adapted to engage the outside of said wall portion, said wall portion 3 being, for example, a portion of the stack of an orchard heater and being provided with an opening 5 through which the inner end of the lighting device is inserted. The inner end of the casing or holder 1 is shown as provided with two arms or jaws 6 adapted to hold between them a body of combustible material indicated at 7.

In the preferred form of my invention the igniting operation is effected by striking a match, or other igniting means, a carrier member 8 being for example mounted to slide in the casing or holder 1 and being provided at its inner end with a socket or recess 9 for holding a match indicated at 10. Means are provided for suddenly moving the carrier 8 forwardly or inwardly toward the orchard heater and for normally restraining it from such inward movement under the control of thermostatic means. For this purpose a helical spring 11 may be provided within the casing 1 and around the carrier member 8, said spring engaging at one end with a shoulder 8' on said carrier member, so as to be connected to said carrier member, and at the other end with a shoulder 13 on casing 1 and the rear or outer end of the carrier member 8 is provided with an extension or stem 12 formed as a rod extending through an opening 14 in the outer end of the casing 1 and provided with a shoulder 15 adapted to engage the shoulder 13 aforesaid on the casing. The member 8 is mounted within the casing with sufficient looseness to enable it to be shifted laterally as above described so as to cause engagement or disengagement of the shoulders 15 and 13, said shoulders acting as catch means for retaining the stem 12 in set position.

Means are provided in the path of the match when it is moved forward by the carrier 8 to strike the match and ignite the same, said means comprising for example a striker member 16 pivoted at 17 on the holder or casing 1 and having a shoulder portion or striker face 18 extending in the path of the match 10 in such manner that as the match advances or moves inwardly it will encounter this shoulder and will cause the member 16 to turn on the pivot 17 so as to cause the head of the match 10 to rub on the shoulder portion 18 so as to ignite the match. Member 16 has a lower arm 20 which is of sufficient weight to hold the upper portion of said member with the shoulder 18 thereon in position for engagement by the match as stated, and a lug or projection 21 on member 16 is adapted to strike the walls portion 3 aforesaid, to forcibly lift the device and disengage it from the orchard heater on completion of the forward movement of the member 8.

The thermostatic means for control of the device may be of any suitable type, consisting for example of a thermostatic bar 22 formed of two metals having different thermal coefficient of expansion, said bar being fastened at one end, as at 23, to the casing 1 and having at its other end means 24 for engaging the extension or stem 12 of the carrier 8 to disengage shoulder 15 thereof from the shoulder 13. In the form shown in the drawings, the part 24 is formed as a hook adapted to engage beneath the stem or carrier portion 12 to lift the same. An outer casing 25 may be secured to and surround member 1, so as to protect the thermostatic device, this outer casing having an opening 25' sufficiently large to permit free movement of stem 12 at all times. A pin 26 at the outer end of stem 12 serves as a handle for operating same, and engages with the end of casing 25 to arrest the inward movement of the carrier 8.

The above described device may be used as follows:

The carrier 8 is pushed back so as to cause the shoulder 15 to engage back of the shoulder 13 and combustible material, indicated at 7, is packed between jaws 6. Such combustible material may consist, for example, of cotton mixed with celluloid dust or shavings or of any other suitable readily inflammable material capable of sustaining itself in the stated position. The casing 1 is then placed in position on the orchard heater as shown in Figs. 1 and 7 being, for example, inserted through the opening 5 in the stack of an orchard heater 27 (see Fig. 7), and the hooked shoulder 2 being caused to engage inside the wall of the stack so as to hold the device in position, the shoulder 4 being caused to engage the outside of the stack as shown, so as to hold the device in extended substantially horizontal position. The device will thus remain for an indefinite time in such position until the catch means 15 is operated to release the carrier. This releasing action takes place when the temperature falls to a point requiring the operation of the orchard heater, the thermostatic device 22 operating under such temperature conditions to raise the shoulder or catch means 15 sufficiently to release it from the shoulder 13 and the carrier 8 being then moved suddenly forward by operation of spring 11. In this forward movement of the carrier, the head of match 10 strikes and slides over the striker face 18 and thereby effects ignition of the match and of the combustible material 7, and at the same time or immediately thereafter, the body of combustible material is pushed forward by the carrier 8 and ejected in burning condition from the holding means 6, so as to fall into the fuel receptacle of the orchard heater and ignite the fuel therein. As the carrier approaches the end of its forward stroke, the projection 21 engages the wall portion 3 of the orchard heater stack, so as to lift the device and disengage shoulder 2 thereof from the wall of the stack and the device then falls to the ground so as not to be injured by the heat which is imparted to the stack by the combustion of the fuel within the orchard heater. The device may be later picked up and re-used in the same manner.

Any suitable thermostatic means may be used for automatic control of the device, for example, as shown in Fig. 8, a tube 30 may be coiled around the supporting means or casing 31 which encloses and supports the releasing means indicated at 32 for the carrier member of the ignition device. The tube 30 is fastened at one end as at 33 to said supporting means or casing 31 and carries at its other (free) end a lug 34 engaging a lever 38 pivoted at 38' in the member 31 and having an arm 35 adapted to engage the member 32 to move it laterally so as to disengage a shoulder 36 thereon from a shoulder 37 on the casing means 31. The tube 30 is hermetically closed at both ends and may be filled with water, which expands when the temperature reaches or approaches 32° F. Such expansion, on account of the helical or coiled form of the member 30, tends to uncoil said member and to move the arm 35 carried by the free end thereof, so as to disengage the shoulder on member 32 from the shoulder on member 31 in such manner as to trip and release the carrier member for the ignition means under the conditions stated. The construction and operation of the device, including the carrier member and igniting means operated thereby, may be the same as above described in connection with the form shown in Fig. 1.

I claim:

1. An igniting device for orchard heaters comprising a supporting means provided with means for detachably engaging a part of the orchard heater and with means for holding combustible material, means mounted on said supporting means for igniting said combustible material, means mounted on said supporting means for igniting and ejecting said combustible material, thermostatically controlled means for operating said igniting and ejecting means when the temperature falls to a given point, and means controlled by the operation of said igniting and ejecting means for disengaging the supporting means from the orchard heater.

2. Means for igniting orchard heaters comprising supporting means, a carrier mounted to move on said supporting means and provided with means for holding a match, catch means for holding said carrier in normal position, spring means for moving said carrier when released by said catch means, striker means movably mounted on said supporting means in position to be engaged by the match and to strike the same upon the movement of the carrier member under the operation of said spring, and thermostatically controlled means for releasing said catch means and means for supporting a body of combustible material in position to be ignited by the match held by the carrier and to be engaged by said striker, when the latter is operated by the match, to inject said body of combustible material from its supporting means.

3. A construction as set forth in claim 2 and comprising in addition, means on said supporting means for detachably engaging a part of an orchard heater to mount the device in position thereon and means operated by said striker means to disengage the supporting means from said part of the orchard heater.

4. Means for igniting an orchard heater comprising supporting means provided with shoulder means for engaging an orchard heater to detachably support the supporting means in position on the orchard heater, a striker member pivotally mounted on said supporting means and provided with a portion adapted to engage the orchard heater when the said striker member is operated to disengage the shoulder means from the orchard heater so as to detach the supporting means from the orchard heater, a match carrier movably mounted on said supporting means and adapted to support a match in position to engage said striker member to operate the striker member and ignite the match when said match carrier is operated, spring means for operating said match carrier, and thermostatically controlled means for normally holding said match carrier from operation.

5. A construction as set forth in claim 4 and comprising, in addition, means for holding a body of combustible material in the path of movement of the striker member and of the match carried by the match carrier so as to cause said body of combustible material to be ignited by the match and to be ejected by operation of the striker member when the match carrier is operated.

In testimony whereof I have hereunto subscribed my name this 14th day of July, 1930.

JOHN A. WALLER.